US008259792B2

(12) United States Patent
Joung et al.

(10) Patent No.: US 8,259,792 B2
(45) Date of Patent: *Sep. 4, 2012

(54) METHOD AND APPARATUS FOR ILLUMINATION COMPENSATION IN MULTI-VIEW VIDEO CODING

(75) Inventors: Do-Young Joung, Seoul (KR); Tae-Sung Park, Yongin-si (KR); Yun-Je Oh, Yongin-si (KR); Doug-Young Suh, Seongnam-si (KR); Yung-Lyul Lee, Seoul (KR); Gwang-Hoon Park, Seongnam-si (KR); Kyu-Heon Kim, Seoul (KR); Min-Woo Park, Suwon-si (KR); Sung-Chang Lim, Seoul (KR)

(73) Assignees: Samsung Electronics Co., Ltd., Samsung-ro, Yeongtong-gu, Suwon-si, Gyeonggi-do (KR); University-Industry Cooperation Group of Kyung Hee University, Seocheon-Dong, Giheung-Gu, Yongin-Si, Gyeonggi-Do (KR)

( * ) Notice: Subject to any disclaimer, the term of this patent is extended or adjusted under 35 U.S.C. 154(b) by 1106 days.

This patent is subject to a terminal disclaimer.

(21) Appl. No.: 12/145,578

(22) Filed: Jun. 25, 2008

(65) Prior Publication Data
US 2009/0010340 A1    Jan. 8, 2009

(30) Foreign Application Priority Data

Jun. 25, 2007   (KR) .................. 10-2007-0062513
Feb. 19, 2008   (KR) .................. 10-2008-0014999

(51) Int. Cl.
H04N 7/12    (2006.01)
(52) U.S. Cl. ............... 375/240.02; 375/240.24
(58) Field of Classification Search ............ 375/240.01, 375/240.02, 240.12, 240.24; 348/47
See application file for complete search history.

(56) References Cited

U.S. PATENT DOCUMENTS

| 2006/0023787 | A1 | 2/2006 | Cai et al. |
| 2007/0177672 | A1* | 8/2007 | Yang ................... 375/240.25 |
| 2007/0177811 | A1* | 8/2007 | Yang ....................... 382/233 |
| 2010/0098157 | A1* | 4/2010 | Yang ................... 375/240.12 |

FOREIGN PATENT DOCUMENTS

| WO | WO 2006/033953 | 3/2006 |
| WO | WO 2007/047736 | 4/2007 |

OTHER PUBLICATIONS

Lee, Yung-Lyul, et al.; "CE11: Illumination Compensation;" ITU Study Group 16—Video Coding Experts Group; No. JVT-UO52; Oct. 26, 2006; XP030006698.

Park, Gwang Hoon, et al.; "Simplification of B- and P-SKIP Modes on Illumination Compensation;" JVT Meeting;MPEG Meeting; No. JVT-Y033; Oct. 20, 2007; XP030007238.

Lee, Yung-Lyul, et al.; "Results of CE2 on Multi-View Video Coding;" JVT Meeting, 82.MPEG Meeting; No. M13498; Jul. 12, 2006; XP0300042167.

* cited by examiner

Primary Examiner — Andrew Lee
(74) Attorney, Agent, or Firm — Cha & Reiter, LLC

(57) ABSTRACT

Disclosed is a method of determining illumination compensation in a multi view video coding. The method includes determining when a current block performing illumination compensation is in a B skip mode and deriving a predicted illumination compensation value of the current block by using information regarding neighbor blocks of the current block and when the derived predicted illumination compensation value is not determining, setting the current block not to perform the illumination compensation; and when the derived predicted illumination compensation value is determining, setting the current block to perform the illumination compensation.

15 Claims, 12 Drawing Sheets

```
Void MbDataAccess::xSpatialDirectMode( ParIdx8x8 eParIdx, Bool b8x8 )
{
...

#if TMS_SE_MVC_IC & TMS_SE_MVC_IC_DIRECT
  if(!getSH().getAVCFlag()) //JVT-W035
  {
  if( getMbData().getBlkMode( Par8x8( eParIdx < PART_8x8_2 ? (eParIdx>>1) :
((eParIdx - 4)>>1)) ) != BLK_SKIP ) {
    if( eParIdx == PART_8x8_0 ) {
      Icp& cIcp = getMbData().getMbIcp().getIcp();
      getIcpPredictor(cIcp, ascRefIdx[LIST_0], ascRefIdx[LIST_1]);
      getIcpFlagPredictor(cIcp, ascRefIdx[LIST_0], ascRefIdx[LIST_1]); //JVT-W031
    }
    else
    if( eParIdx == PART_8x8_3 ) {
      Icp cIcp, &cPrevIcp = getMbData().getMbIcp().getIcp();
      getIcpPredictor(cIcp, ascRefIdx[LIST_0], ascRefIdx[LIST_1]);
      cPrevIcp.setPredOffset( (cPrevIcp.getPredOffset() + cIcp.getPredOffset())/4 );
      getIcpFlagPredictor(cIcp, ascRefIdx[LIST_0], ascRefIdx[LIST_1]); //JVT-W031
      cPrevIcp.setPredIcAct( cPrevIcp.getPredIcAct() | cIcp.getPredIcAct() ); //JVT-W031

}
    else {
      Icp cIcp, &cPrevIcp = getMbData().getMbIcp().getIcp();
      getIcpPredictor(cIcp, ascRefIdx[LIST_0], ascRefIdx[LIST_1]);
      cPrevIcp.setPredOffset( cPrevIcp.getPredOffset() + cIcp.getPredOffset() );
      getIcpFlagPredictor(cIcp, ascRefIdx[LIST_0], ascRefIdx[LIST_1]); //JVT-W031
      cPrevIcp.setPredIcAct( cPrevIcp.getPredIcAct() | cIcp.getPredIcAct() ); //JVT-W031

}
  }
}
}
#endif
}

//JVT-W031
Void MbDataAccess::getIcpFlagPredictor( Icp& rcIcp, SChar scRefIdx0, SChar scRefIdx1 )

{ B4x4Idx    cIdx;
  MbMode     ePrevMbMode;
  MbIcp      cPrevMbIcp;
  MbMotionData cPrevMbMotionData0, cPrevMbMotionData1;

B4x4Idx cIdxA = B4x4Idx(0).b4x4();
  B4x4Idx cIdxB = B4x4Idx(0).b4x4();
  B4x4Idx cIdxD = B4x4Idx(0).b4x4();
  B4x4Idx cIdxC = B4x4Idx(3).b4x4();
```

FIG.6A
(PRIOR ART)

```
const MbData& rcMbDataAbove       = xGetBlockAbove      ( cIdxA );
const MbData& rcMbDataLeft        = xGetBlockLeft       ( cIdxB );
const MbData& rcMbDataAboveRight  = xGetBlockAboveRight( cIdxC );
const MbData& rcMbDataAboveLeft   = xGetBlockAboveLeft ( cIdxD );

Bool bBlkValidA, bBlkValidB, bBlkValidC;
short sICflagA, sICflagB, sICflagC;

bBlkValidA = bBlkValidB = bBlkValidC = false;
sICflagA   = sICflagB   = sICflagC   = 0;

// above block
if( xIsAvailable( rcMbDataAbove ) )
{
    ePrevMbMode      = rcMbDataAbove.getMbMode();
    cPrevMbIcp       = rcMbDataAbove.getMbIcp();
    cPrevMbMotionData0 = rcMbDataAbove.getMbMotionData(LIST_0);
    cPrevMbMotionData1 = rcMbDataAbove.getMbMotionData(LIST_1);
         cIdx         = cIdxA;

if( ePrevMbMode == MODE_SKIP || ePrevMbMode == MODE_16x16 )
             sICflagA  = cPrevMbIcp.getIcp().getIcAct();
         if(            scRefIdx0==cPrevMbMotionData0.getRefIdx(cIdx)             &&
scRefIdx1==cPrevMbMotionData1.getRefIdx(cIdx) )
             bBlkValidA = true;
}
// left block
if( xIsAvailable( rcMbDataLeft ) )
{
    ePrevMbMode      = rcMbDataLeft.getMbMode();
    cPrevMbIcp       = rcMbDataLeft.getMbIcp();
    cPrevMbMotionData0 = rcMbDataLeft.getMbMotionData(LIST_0);
    cPrevMbMotionData1 = rcMbDataLeft.getMbMotionData(LIST_1);
         cIdx         = cIdxB;

if( ePrevMbMode == MODE_SKIP || ePrevMbMode == MODE_16x16 )
             sICflagB  = cPrevMbIcp.getIcp().getIcAct();
         if(            scRefIdx0==cPrevMbMotionData0.getRefIdx(cIdx)             &&
scRefIdx1==cPrevMbMotionData1.getRefIdx(cIdx) )
             bBlkValidB = true;
}
// aboveright block
if( xIsAvailable( rcMbDataAboveRight ) )
{
    ePrevMbMode      = rcMbDataAboveRight.getMbMode();
```

FIG.6B
(PRIOR ART)

```
        cPrevMbIcp       = rcMbDataAboveRight.getMbIcp();
        cPrevMbMotionData0 = rcMbDataAboveRight.getMbMotionData(LIST_0);
        cPrevMbMotionData1 = rcMbDataAboveRight.getMbMotionData(LIST_1);
            cIdx         = cIdxC;

if( ePrevMbMode == MODE_SKIP || ePrevMbMode == MODE_16x16 )
                sICflagC = cPrevMbIcp.getIcp().getIcAct();
        if(           scRefIdx0==cPrevMbMotionData0.getRefIdx(cIdx)            &&
scRefIdx1==cPrevMbMotionData1.getRefIdx(cIdx) )
                bBlkValidC = true;
    }
    else
    // aboveleft block
    if( xIsAvailable( rcMbDataAboveLeft ) )
    {
        ePrevMbMode     = rcMbDataAboveLeft.getMbMode();
        cPrevMbIcp      = rcMbDataAboveLeft.getMbIcp();
        cPrevMbMotionData0 = rcMbDataAboveLeft.getMbMotionData(LIST_0);
        cPrevMbMotionData1 = rcMbDataAboveLeft.getMbMotionData(LIST_1);
            cIdx            = cIdxD;

if( ePrevMbMode == MODE_SKIP || ePrevMbMode == MODE_16x16 )
                sICflagC = cPrevMbIcp.getIcp().getIcAct();
        if(           scRefIdx0==cPrevMbMotionData0.getRefIdx(cIdx)            &&
scRefIdx1==cPrevMbMotionData1.getRefIdx(cIdx) )
                bBlkValidC = true;
    }
#define MEDIAN(a,b,c)  ((a)>(b)?(a)>(c)?(b)>(c)?(b):(c):(a):(b)>(c)?(a)>(c)?(a):(c):(b))

// IC flag prediction
short sICflag = 0;
{
        if( bBlkValidA && !bBlkValidB && !bBlkValidC )
                sICflag = sICflagA;
        else if( !bBlkValidA && bBlkValidB && !bBlkValidC )
                sICflag = sICflagB;
        else if( !bBlkValidA && !bBlkValidB && bBlkValidC )
                sICflag = sICflagC;
        else
            sICflag = MEDIAN( sICflagA, sICflagB, sICflagC );
}
rcIcp.setPredIcAct( sICflag );
}
```

FIG.6C
(PRIOR ART)

```
Void MbDataAccess::xSpatialDirectMode( ParIdx8x8 eParIdx, Bool b8x8 )
{
 ...
#if TMS_SE_MVC_IC & TMS_SE_MVC_IC_DIRECT
   if(!getSH().getAVCFlag()) //JVT-W035
   {
    if( getMbData().getBlkMode( Par8x8( eParIdx < PART_8x8_2 ? (eParIdx>>1) :
    ((eParIdx - 4)>>1)) ) !=
BLK_SKIP )
     if( eParIdx == PART_8x8_0 ) {
        Icp& clcp = getMbData().getMbIcp().getIcp();
        getIcpPredictor(clcp, ascRefIdx[LIST_0], ascRefIdx[LIST_1]);
        if (clcp.getPredOffset() == 0)  clcp.setPredIcAct(0);
        else                            clcp.setPredIcAct(1);
     }
     else
     if( eParIdx == PART_8x8_3 ) {
        Icp clcp, &cPrevIcp = getMbData().getMbIcp().getIcp();
        getIcpPredictor(clcp, ascRefIdx[LIST_0], ascRefIdx[LIST_1]);
        cPrevIcp.setPredOffset( (cPrevIcp.getPredOffset() + clcp.getPredOffset())/4 );
        if (clcp.getPredOffset() == 0) {
          clcp.setPredIcAct(0);
          cPrevIcp.setPredIcAct(0);
        }
         else {
          clcp.setPredIcAct(1);
          cPrevIcp.setPredIcAct(1);
        }
     }
     else {
     {
       Icp clcp, &cPrevIcp = getMbData().getMbIcp().getIcp();
       getIcpPredictor(clcp, ascRefIdx[LIST_0], ascRefIdx[LIST_1]);
       cPrevIcp.setPredOffset( cPrevIcp.getPredOffset() + clcp.getPredOffset() );
       if (clcp.getPredOffset() == 0) {
         clcp.setPredIcAct(0);
         cPrevIcp.setPredIcAct(0);
       }
       else {
         clcp.setPredIcAct(1);
         cPrevIcp.setPredIcAct(1);
       }
     }
    }
   }
  }
#endif
}
```

FIG.7

METHOD AND APPARATUS FOR ILLUMINATION COMPENSATION IN MULTI-VIEW VIDEO CODING

CLAIM OF PRIORITY

This application claims the benefit of the earlier filing date, under 35 U.S.C. §119(a), to those applications entitled "Method And Apparatus For Illumination Compensation In Multi-View Video Coding" filed in the Korean Industrial Property Office on Jun. 25, 2007 and Feb. 19, 2008, and assigned Serial Nos. 2007-62513 and 2008-14999, respectively, the contents of both of which are hereby incorporated by reference.

CROSS RELATED APPLICATION

This application is related to a patent application filed in the Korean Industrial Property Office on Jun. 26, 2007 and Feb. 19, 2008, and assigned Serial Nos. 2007-62911 and 2008-15011, and a U.S. patent application, which is to be filed on Jun. 26, 2008 the contents of which are incorporated by reference, herein.

BACKGROUND OF THE INVENTION

1. Field of the Invention

The present invention relates to Multi-view Video Coding (MVC), and more particularly to a method and an apparatus for obtaining predicted illumination compensation value and an illumination compensation flag value during the process of illumination compensation in multi-view video coding.

2. Description of the Related Art

With development in video technologies, analog picture processing methods are being replaced by digital picture processing methods. As a result, it has become possible to provide users with pictures which are clearer and have higher picture qualities than pictures captured with older technologies. The improvement in the picture quality has provided users with a much stronger feeling of presence. Recently, High Definition (HD) Television (TV) service for broadcasting a high quality picture is being provided and commercialization of a Digital Multimedia Broadcast (DMB) service transmitting vivid and clear pictures regardless of the place is being prepared. However, the high quality digital video service, which improves the quality of only the picture itself, has a limit in improving the degree of freedom and the feeling of presence that users' have. Representative elements degrading the feeling of presence in the use of a picture include a camera having a fixed view and a picture lacking depth. The fixed camera view degrades the degree of freedom, since it does not allow a user to view a prospective other than that of a current picture while the user views the current picture. Further, since a person can see an object by their eyes being oriented in the same direction from different positions, the person can feel the depth of the object by means of binocular disparity. However, the picture obtained by the fixed camera cannot give the feeling of depth, as it does not take binocular disparity into consideration. In order to solve this problem, a method of simultaneously obtaining multi-view pictures through multiple cameras at multiple viewpoints is being developed.

A scheme for coding multi-view pictures as described above is called a Multi-view Video Coding (MVC) scheme. The MVC refers to a scheme for processing sequences of multiple views of pictures obtained through multiple cameras. According to the MVC, multiple cameras are located at different distances from the same object and/or their orientations toward the same object. The multi-view pictures obtained through the multiple cameras show different degrees of reflections of light from the surface of the same object according to their directions, while the pictures of the views are highly related. This characteristic of the multi-view pictures results in differences in the brightness and color of the pictures for the same object according to the particular view. Therefore, in order to improve the encoding efficiency in the multi-view video coding, the above-described characteristic of the multi-view pictures should be taken into consideration.

The multi-view video coding, standardization of which is actively in progress, is searching for a method for improving an encoding efficiency in consideration of the two above-described characteristics of the multi-view pictures based on the H.264/MPEG-4 part 10 Advanced Video Coding(H.264/AVC), which is an existing international standard for video coding. For example, a hierarchical B-picture coding, which is a method for supporting a temporal scalability in a Joint Scalable Video Coding (JSVC) defined in the H.264/AVC, is also applied to an intra-view prediction coding within the multi-view video coding. Further, in the multi-view video coding performs, an inter-view prediction coding is also performed in parallel, so as to improve the coding efficiency.

FIG. 1 illustrates an example of a prediction structure showing intra-view prediction and inter-view prediction relations in the multi-view video coding. In the example shown in FIG. 1, eight views exist and the Group of Pictures (GOP) of the temporal direction has a size of 8. In FIG. 1, each of S0, S1, S2, S3 . . . S7 indicates one view, and T0, T1, T2, T3, . . . T100 indicate a temporal direction.

Referring to FIG. 1, it is noted that a prediction coding in the temporal direction is performed by using the hierarchical B-picture coding defined in the H.264/AVC in each view. Further, in each view, a picture of the first time band T0 and pictures (at T8, T16, T24, . . . ) spaced every 8 frames (which is the size of a GOP) away from the picture of the first time band T0 are called "anchor pictures." For the anchor pictures, only the prediction (i.e. inter-view prediction) from neighbor views is performed. For example, at the time bands T0, T8, T16, T24, . . . , prediction is performed for the S2 view from the S0 view of the same time band, for the S1 view from the S0 view and the S2 view of the same time band, for the S4 view from the S2 view of the same time band, for the S3 view from the S2 view and the S4 view of the same time band, for the S6 view from the S4 view of the same time band, for the S5 view from the S4 view and the S6 view of the same time band, and for the S7 view from the S6 view of the same time band. In the case of the S7 view, since it is the last view, its prediction is performed from the S6 view.

For non-anchor pictures, prediction of the temporal direction is basically performed, and prediction from neighbor views is additionally performed for every second view (i.e. S1, S3, S5, and S7). That is, not only intra-view prediction of the temporal direction is performed, but also inter-view prediction is performed for the S1 view from the S0 view and the S2 view, for the S3 view from the S2 view and the S4 view, and for the S5 view from the S4 view and the S6 view, etc.

The multi-view video coding, international standardization of which is currently in progress, employs an illumination compensation method in order to improve a coding efficiency by compensating for a difference between luminance signals existing in the temporal direction or between views.

Illumination compensation-related data include flag information indicating if a current block uses illumination compensation, an illumination compensation value that includes an IC offset or a Difference Value of Illumination Change (DVIC; a luminance signal average difference between a current block and a reference block), and information regarding if illumination compensation will be performed and regarding a predicted illumination compensation value derived from neighbor blocks.

SUMMARY OF THE INVENTION

Accordingly, the present invention provides a method and an apparatus for efficiently predicting a flag indicating whether to perform illumination compensation and a predicted illumination compensation value in multi-view video coding.

In accordance with an aspect of the present invention, there is provided a method of illumination compensation in a multi view video coding, the method including the steps of determining when a current block performing illumination compensation is in a B skip mode, and deriving a predicted illumination compensation value of the current block by using information on neighbor blocks of the current block, and when the derived predicted illumination compensation value is 0, setting the current block not to perform the illumination compensation and when the derived predicted illumination compensation value is not 0, setting the current block to perform the illumination compensation.

When the current block is in a B skip mode, the neighbor blocks of the current block comprise a first block, which is an upper neighbor block of the current block, a second block, which is a left neighbor block of the current block, a third block, which is a right neighbor block of the first block, and a fourth block, which is an upper neighbor block of the second block.

The step of deriving a predicted illumination compensation value of the current block comprises the steps of determining if the first block, which is the upper neighbor block of the current block, uses illumination compensation and if a picture referred to by the first block is equal to a picture referred to by the current block, and setting an illumination compensation value of the first block as the predicted illumination compensation value of the current block when the picture referred to by the first block is equal to the picture referred to by the current block, and when the picture referred to by the first block is not equal to the picture referred to by the current block, determining if the second block, which is the left neighbor block of the current block, uses illumination compensation and if a picture referred to by the second block is equal to the picture referred to by the current block, and setting an illumination compensation value of the second block as the predicted illumination compensation value of the current block when the picture referred to by the second block is equal to the picture referred to by the current block and when the picture referred to by the second block is not equal to the picture referred to by the current block, determining if the third block, which is the right neighbor block of the first block, uses illumination compensation and if a picture referred to by the third block is equal to the picture referred to by the current block, and setting an illumination compensation value of the third block as the predicted illumination compensation value of the current block when the picture referred to by the third block is equal to the picture referred to by the current block and when the picture referred to by the third block is not equal to the picture referred to by the current block, determining if the fourth block, which is the upper neighbor block of the second block, uses illumination compensation and if a picture referred to by the fourth block is equal to the picture referred to by the current block, and setting an illumination compensation value of the fourth block as the predicted illumination compensation value of the current block when the picture referred to by the fourth block is equal to the picture referred to by the current block, when the picture referred to by the fourth block is not equal to the picture referred to by the current block, determining if all of the first block, the second block, and the third block use illumination compensation, and setting a median value of illumination compensation values of the first block, the second block, and the third block as the predicted illumination compensation value of the current block when all of the first block, the second block, and the third block use illumination compensation; and when any of the first block, the second block, and the third block does not perform illumination compensation, setting the predicted illumination compensation value of the current block to 0.

In accordance with another aspect of the present invention, there is provided an apparatus for illumination compensation when a current block performing illumination compensation is in a B skip mode in a multi view video coding, the apparatus comprising a predicted illumination compensation value deriver for receiving a reference picture index of the current block and information on neighbor blocks of the current block, and deriving and outputting a predicted illumination compensation value, a flag setting unit for receiving the derived predicted illumination compensation value, and setting and outputting a flag indicating if the current block performs illumination compensation, based on the derived predicted illumination compensation value and an illumination compensation/movement compensation unit for performing illumination compensation and movement compensation by using a movement vector, a reference picture, the predicted illumination compensation value, and the flag indicating if the current block performs illumination compensation.

The flag setting unit sets a flag value indicating if the current block performs illumination compensation to 0 when the received predicted illumination compensation value is 0, and sets the flag value to 1 when the received predicted illumination compensation value is not 0.

BRIEF DESCRIPTION OF THE DRAWINGS

The above and other aspects, features and advantages of the present invention will be more apparent from the following detailed description taken in conjunction with the accompanying drawings, in which:

FIGS. 6A, 6B, and 6C illustrate an example of a program actually implementing an existing process of predicting an illumination compensation indicating flag from blocks in a B skip mode;

FIG. 7 illustrates an example of a program actually implementing a process of predicting an illumination compensation indicating flag from blocks in a B skip mode according to an embodiment of the present invention;

DETAILED DESCRIPTION OF THE INVENTION

Exemplary embodiments of the present invention will be described with reference to the accompanying drawings. In the following description, various specific definitions found in the following description are provided only to help general understanding of the present invention, and it is apparent to those skilled in the art that the present invention can be implemented without such definitions. For the purposes of clarity and simplicity, a detailed description of known functions and configurations incorporated herein will be omitted as it may make the subject matter of the present invention rather unclear.

Figure 1:
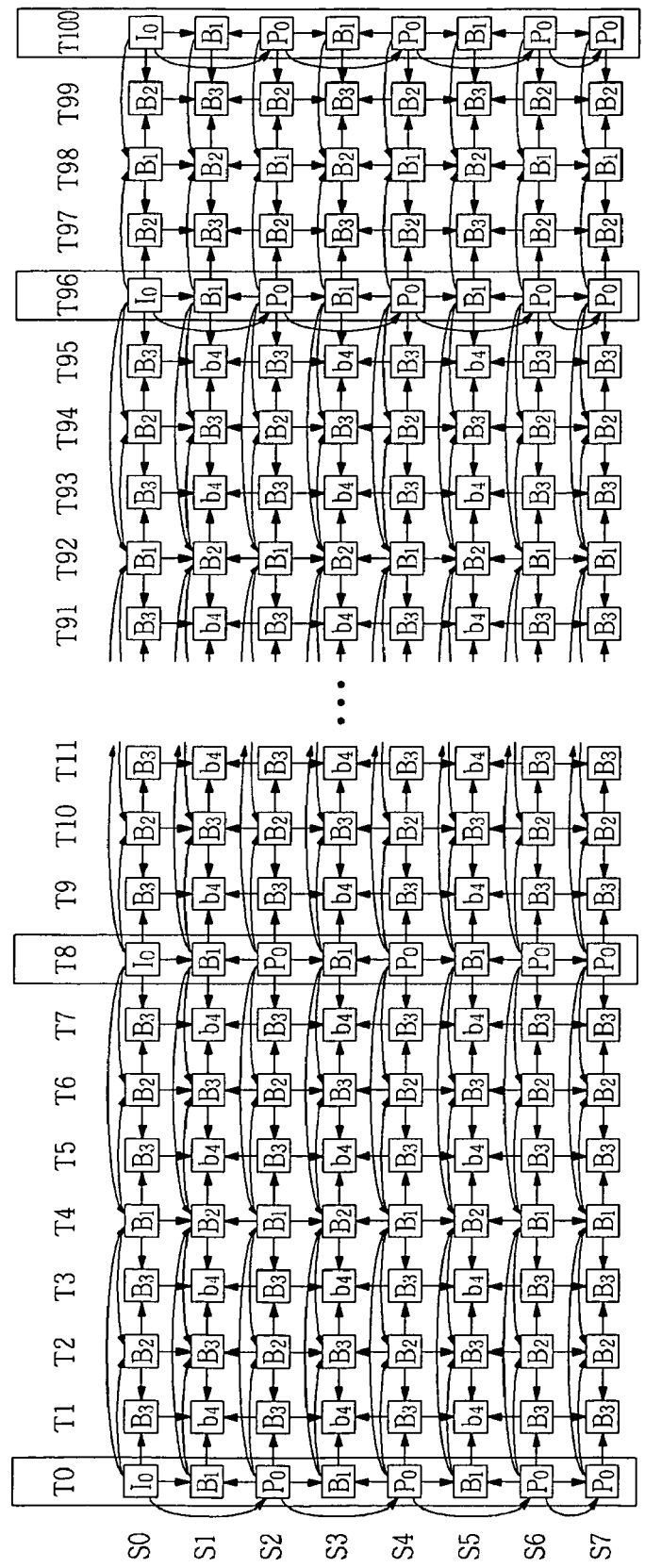
FIG. 1 illustrates an example of a prediction structure showing conventional intra-view prediction and inter-view prediction relations in the multi-view video coding.
Figure 2:
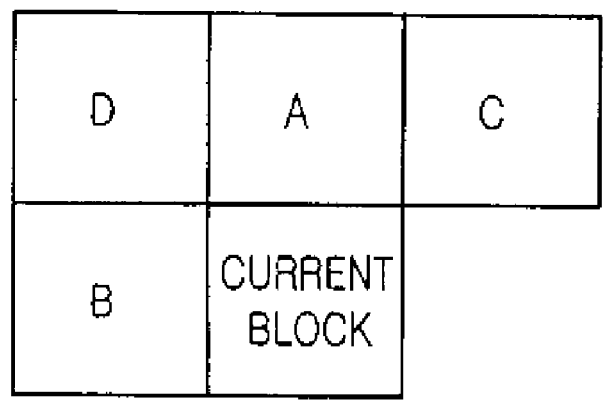
FIG. 2 illustrates neighbor blocks used in order to derive a predicted illumination compensation value in a multi-view video coding.

FIG. 2 illustrates neighbor blocks used in order to derive a predicted illumination compensation value in a multi-view video coding. In the case of determining whether to perform illumination compensation and deriving a predicted illumination compensation value from neighbor blocks, neighbor blocks A, B, C, and D around the current block as shown in FIG. 2 are used as the neighbor blocks. In the case of transmitting an illumination compensation value, a predicted illumination compensation value is derived from the neighbor blocks, and an illumination compensation value difference (i.e., the illumination compensation value minus the predicted illumination compensation value) is then transmitted.

Methods of deriving information on whether to perform illumination compensation and a predicted illumination compensation value are different according to the types of blocks, which include three block types. The first block type corresponds to a case of transmitting a flag indicating whether to perform illumination compensation and an illumination compensation value difference (inter 16×16 mode, B direct 16×16 mode), the second block type corresponds to a P skip mode, and the third block type corresponds to a B skip mode.

First, a method of deriving a predicted illumination compensation value from neighbor blocks (blocks A, B, C, and D of FIG. 2) adjacent to a current block in the case of transmitting a flag and an illumination compensation value difference (inter 16×16 mode, B direct 16×16 mode) will be described with reference to FIG. 3.

Figure 3:
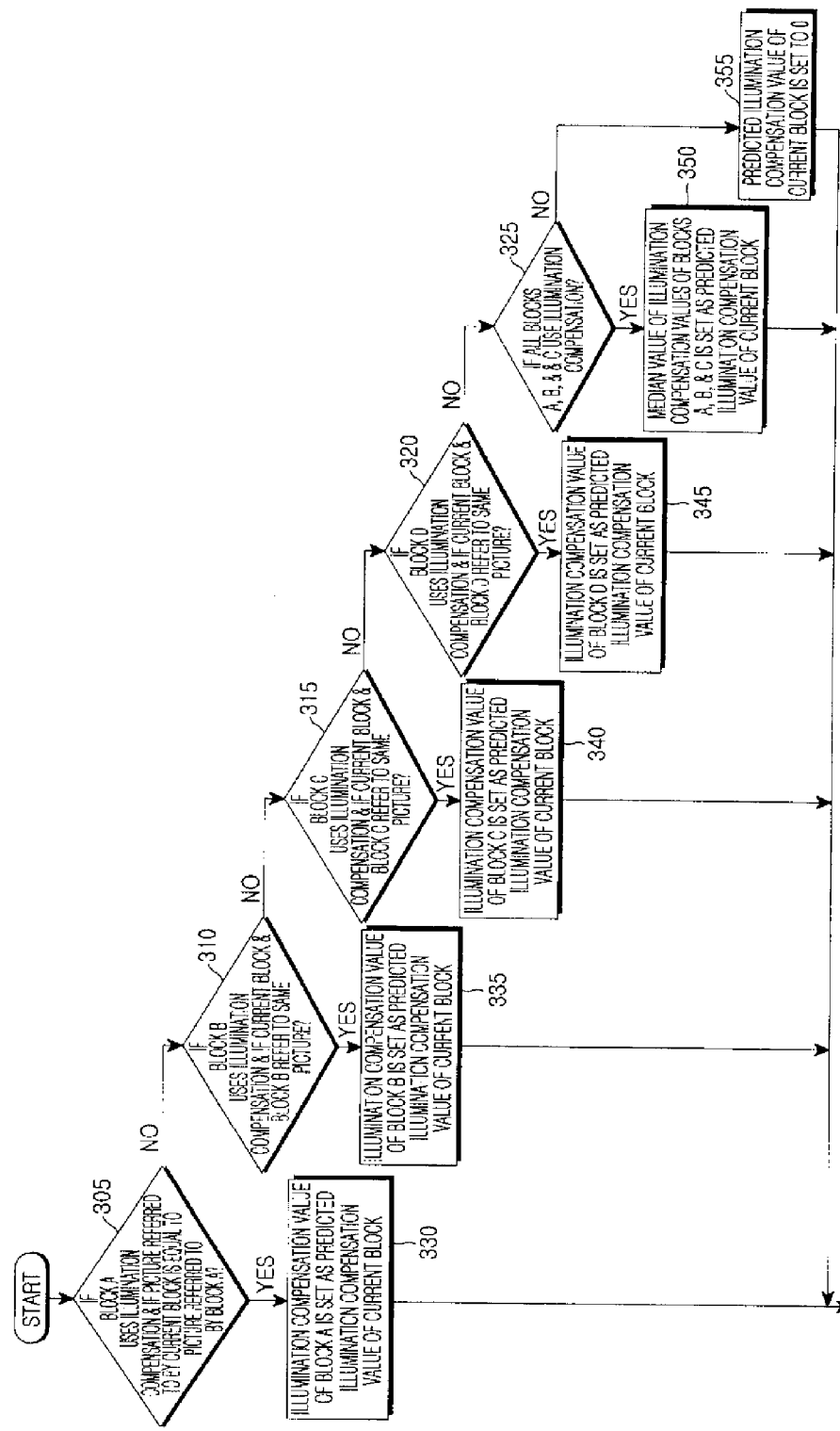
FIG. 3 is a flow diagram of a process of deriving a predicted illumination compensation value from neighbor blocks in the case of transmitting an illumination compensation indicating flag and an illumination compensation value difference.

FIG. 3 is a flow diagram of a process of deriving a predicted illumination compensation value from neighbor blocks in the case of transmitting an illumination compensation indicating flag and an illumination compensation value difference.

Referring to FIG. 3, first in step 305, a determination is made whether the block A, which is an upper neighbor block of the current block, uses illumination compensation, and whether a picture referred to by the current block is equal to a picture to which the block A refers. As a result of the determination in step 305, when the block A uses illumination compensation and the current block and the block A refer to the same picture, the illumination compensation value of the block A is used as the predicted illumination compensation value of the current block (step 330). Then, the process is terminated.

As a result of the determination in step 305, when the answer is "No," a determination is made whether the block B, which is a left neighbor block of the current block, uses illumination compensation, and if the current block and the block B refer to the same picture (step 310). As a result of the determination in step 310, when the block B uses illumination compensation and the current block and the block B refer to the same picture, the illumination compensation value of the block B is used as the predicted illumination compensation value of the current block (step 335). Then, the process is terminated.

As a result of the determination in step 310, when the answer is "No," a determination is made whether the block C, which is a right neighbor block of the current block, uses illumination compensation, and if the current block and the block C refer to the same picture (step 315). As a result of the determination in step 315, when the block C uses illumination compensation and the current block and the block C refer to the same picture, the illumination compensation value of the block C is used as the predicted illumination compensation value of the current block (step 340). Then, the process is terminated.

As a result of the determination in step 315, when the answer is "No," a determination is made whether the block D, which is an upper neighbor block of the block B, uses illumination compensation, and if the current block and the block D refer to the same picture (step 320). As a result of the determination in step 320, when the block D uses illumination compensation and the current block and the block D refer to the same picture, the illumination compensation value of the block D is used as the predicted illumination compensation value of the current block (step 345). Then, the process is terminated.

As a result of the determination in step 320, when the answer is "No," a determination is made whether each of the blocks A, B, and C uses illumination compensation (step 325). As a result of the determination in step 325, when each of the blocks A, B, and C use illumination compensation, a median value of the illumination compensation values of the blocks A, B, and C is used as the predicted illumination compensation value of the current block (step 350). Then, the process is terminated.

As a result of the determination in step 325, when the answer is "No," the predicted illumination compensation value of the current block is set to "0" (step 355). Then, the process is terminated.

The median value set in step 350 corresponds to a value selected from among a set of numbers such that a half of the numbers of the set is larger than the median value and the other half thereof is smaller than the median value. If the set includes an even number of numbers, an average of two middle numbers is determined as the median value.

In the case of a P skip mode block, which corresponds to the second block type, a predicted illumination compensation value derived from the blocks A and B located around the current block is used as the illumination compensation value. A method for deriving a predicted illumination compensation value in the P skip mode will be described hereinafter with reference to FIG. 4.

Figure 4:
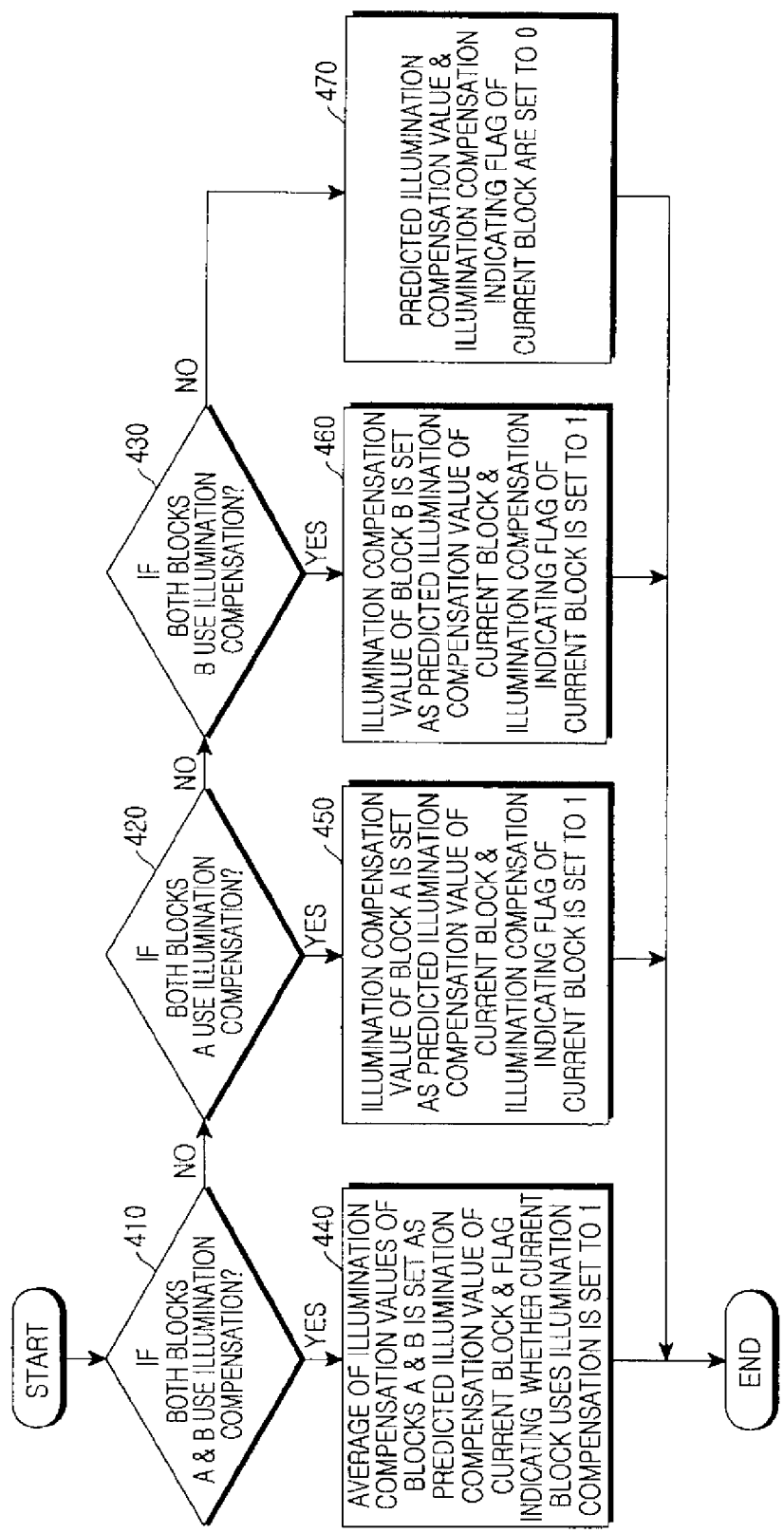
FIG. 4 is a flow diagram of a process of deriving a predicted illumination compensation value and an illumination compensation indicating flag from P skip mode blocks.

FIG. 4 is a flow diagram of a process of deriving a predicted illumination compensation value and an illumination compensation indicating flag from P skip mode blocks. Referring to FIG. 4, in step 410, a determination is made whether both of the block A, which is an upper neighbor block of the current block, and the block B, which is a left neighbor block of the current block, use the illumination compensation. As a result of the determination in step 410, when both of the block A and the block B use the illumination compensation, an average value of the illumination compensation values of the blocks A and B is determined and used as a predicted illumination compensation value of the current block, and a flag indicating the current block uses the illumination compensation is set to "1" (step 440). Then, the process is terminated.

As a result of the determination in step 410, when either of the block A and the block B does not use the illumination compensation, it is determined whether only the block A uses the illumination compensation while the block B does not use the illumination compensation (step 420). As a result of the determination in step 420, when only the block A uses the illumination compensation, the illumination compensation value of the block A is used as a predicted illumination compensation value of the current block, and the flag indicating the current block uses the illumination compensation is set to "1" (step 450). Then, the process is terminated.

As a result of the determination in step 420, when the block A does not use the illumination compensation, it is determined if only the block B uses the illumination compensation while the block A does not use the illumination compensation (step 430). As a result of the determination in step 430, when only the block B uses the illumination compensation, the illumination compensation value of the block B is used as a predicted illumination compensation value of the current block, and the flag indicating the current block uses the illumination compensation is set to "1" (step 460). Then, the process is terminated.

As a result of the determination in step 430, when the block B also does not use the illumination compensation, the predicted illumination compensation value of the current block is set to "0" and the flag indicating the current block uses the illumination compensation is set to "0" (step 470). Then, the process is terminated.

In the case of a B skip mode block, flag information on whether a current blocks uses illumination compensation is derived from the neighbor blocks A, B, and C of the current block.

When the derived illumination compensation indicating flag is "1," the method of deriving a predicted illumination compensation value (as shown in FIG. 3), which is used in the block type corresponding to the case of transmitting an illumination compensation indicating flag and an illumination compensation value difference (inter 16×16 mode, B direct 16×16 mode), is used as it is. Further, when the derived illumination compensation indicating flag is "0, " the illumination compensation value is set to "0."

Basically, blocks A, B, and C are used in deriving the illumination compensation indicating flag. When the block C is not available, the block D is used instead of the block C. A method of deriving an illumination compensation indicating flag of a B skip mode block will be described below.

First, when a reference picture of one block among the blocks A, B, and C around the current block is equal to a reference picture of the current block, an illumination compensation indicating flag of the block having the same reference picture as that of the current block is used as an illumination compensation indicating flag of the current block. However, when a reference picture of one block among the blocks A, B, and C around the current block is not equal to the reference picture of the current block, a median value of illumination compensation indicating flags of the blocks A, B, and C is used as the illumination compensation indicating flag of the current block.

In the case of B skip mode from among the methods of deriving a predicted illumination compensation value included in current international multi-view video coding standards, the operation is divided into two parts. One part thereof is an operation of predicting a flag value indicating whether to perform illumination compensation, and the other part is an operation of deriving a predicted illumination compensation value. However, in the existing method, the two parts cannot perform a consistent prediction.

In the B skip mode, blocks A, B, and C are basically used (block D is used only when the block C is unavailable) in predicting an illumination compensation indicating value, while all the blocks A, B, C, and D are used in deriving a predicted illumination compensation value.

Further, in predicting an illumination compensation indicating value, when all the blocks A, B, C, and D refer to a picture different from that of the current block and two blocks from among the blocks A, B, and C use the illumination compensation, "1" is predicted as the illumination compensation indicating value. However, in a method of deriving a predicted illumination compensation value, 0 is derived as the predicted illumination compensation value.

The existing method of deriving an illumination compensation indicating flag and a predicted illumination compensation value as described above may yield a case where the predicted illumination compensation value is 0 when the illumination compensation indicating flag is 1. This case may have a continuous effect on the prediction, which may degrade the entire coding capability.

The present invention proposes a method for prediction in a simple and constant manner in deriving a predicted illumination compensation value and an illumination compensation indicating flag in a skip mode of an illumination compensation process of a multi-view video coding, and a method for efficiently transmitting information of an illumination compensation indicating flag and a predicted illumination compensation value in a block mode of transmitting the illumination compensation indicating flag and an illumination compensation value difference.

Method for Illumination Compensation of a B Skip Mode

A method of predicting an illumination compensation indicating flag and an illumination compensation value in a B skip mode according to an embodiment of the present invention is now described.

First, a predicted illumination compensation value is derived by using an existing method of predicting an illumination compensation indicating flag and an illumination compensation value in a B skip mode. Then, the illumination compensation indicating flag is determined based on the derived predicted illumination compensation value. Specifically, the illumination compensation indicating flag is determined to be 0 when the derived predicted illumination compensation value is 0, and the illumination compensation indicating flag is determined to be 1 when the derived predicted illumination compensation value is not 0.

Figure 5:
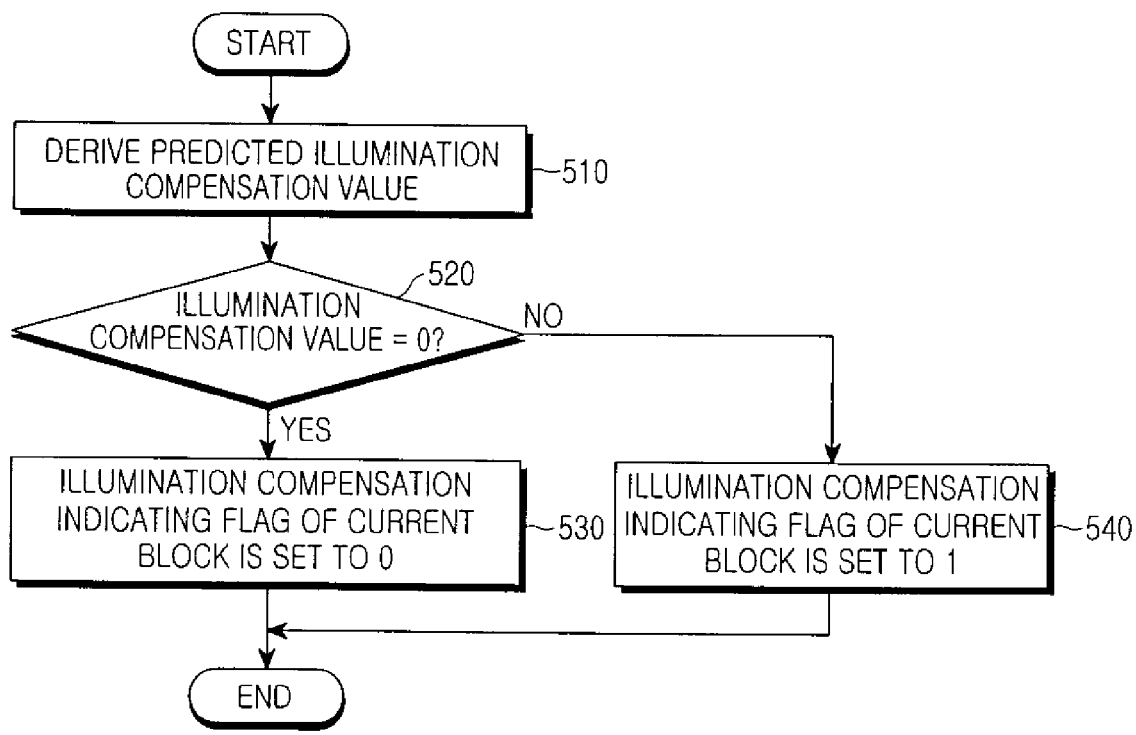
FIG. 5 is a flow diagram of a process of predicting an illumination compensation indicating flag in the case of transmitting an illumination compensation indicating flag and an illumination compensation value difference according to an embodiment of the present invention.

FIG. 5 is a flow diagram of a process of predicting an illumination compensation indicating flag from blocks in a B skip mode according to an embodiment of the present invention. Referring to FIG. 5, in a process of deriving a predicted illumination compensation value and an illumination compensation indicating flag in a B skip mode according to an embodiment of the present invention, a predicted illumination compensation value is first derived in step 510. In this step, the method of deriving a predicted illumination compensation value in a B skip mode (the method of deriving a predicted illumination compensation value in the case of a block type transmitting a flag and an illumination compensation value difference) as described above with reference to FIG. 3 is used to derive the predicted illumination compensation value. Then, in step 520, by using the predicted illumination compensation value derived in step 510, it is determined if the calculated illumination compensation value is "0." As a result of the determination in step 520, when the calculated illumination compensation value is "0," the illumination compensation indicating flag of the current block is set to "0" (step 530). In comparison, the determination in step 520 shows that the illumination compensation value is not "0," the illumination compensation indicating flag is set to "1" (step 540).

FIGS. 6A, 6B, and 6C illustrate an example of a program actually implementing an existing process of predicting an illumination compensation indicating flag from blocks in a B skip mode.

FIGS. 6A, 6B, and 6C illustrate an example of one program, which is separated into three parts on three separate sheets due to the limited capacity of each sheet although the three parts constitute only one program. Referring to the emphasized parts by the bold script in FIGS. 6A, 6B, and 6C, flag information is first derived from the blocks A, B, and C, which are neighbor blocks of the current block, by using the "getIcpFlagPredictor( )" function (lines 29 to 38 of FIG. 6C), and the operation is then performed based on the derived flag information.

FIG. 7 illustrates an example of a program for implementing a process of predicting an illumination compensation indicating flag from blocks in a B skip mode according to an embodiment of the present invention. Referring to the emphasized parts by the bold script in FIG. 7, the step of deriving flag information from the neighbor blocks (the blocks A, B, and C of FIG. 2) of the current block (by using the "getIcpFlagPredictor( )" function of FIG. 6C) is not performed. Instead, it is first determined whether the derived illumination compensation value is "0" ("if(clcp.getPredOffset( )==0)"), and the flag value is set based on a result of the determination in the process according to an embodiment of the present invention. In comparison between the example shown in FIGS. 6A, 6B, and 6C and the example shown in FIG. 7, the flag predicting method according to an embodiment of the present invention does not separately perform the step of deriving flag information ("getIcpFlagPredictor( )" function). Therefore, in comparison with the existing method, the method of the invention can implement the flag information predicting part through a much simpler operation.

Illumination Compensation Apparatus of B Skip Block

Figure 8:
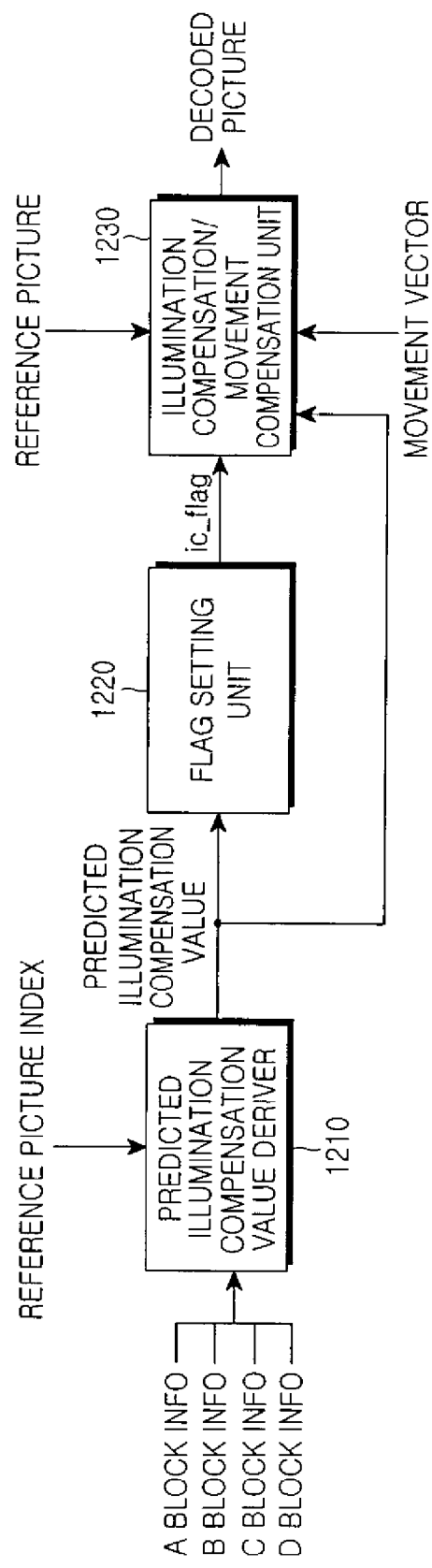
FIG. 8 is a block diagram of an apparatus for deriving a predicted illumination compensation value and an illumination compensation indicating flag from skip mode blocks according to an embodiment of the present invention.

FIG. 8 is a block diagram of an apparatus for deriving a predicted illumination compensation value and an illumination compensation indicating flag from skip mode blocks according to an embodiment of the present invention. Hereinafter, an apparatus for deriving a predicted illumination compensation value and an illumination compensation indicating flag from blocks in a skip mode according to an embodiment of the present invention will be described in detail with reference to FIG. 8.

An apparatus for deriving a predicted illumination compensation value and an illumination compensation indicating flag from blocks in a skip mode according to an embodiment of the present invention includes a predicted illumination compensation value deriver 1210, a flag setting unit 1220, and an illumination compensation/movement compensation unit 1230.

The predicted illumination compensation value deriver 1210 receives a reference picture index of a current block and information (an illumination compensation indicating flag, an illumination compensation value, a reference picture index, a block type, etc.) of neighbor blocks (blocks A, B, C, and D of FIG. 2) of the current block, and derives and outputs a predicted illumination compensation value.

The multi-view video coding, international standardization of which is in progress, uses blocks A, B, C, and D in the B skip mode and blocks A and B in the P skip mode. Specifically, the B skip mode employs the existing method of deriving a predicted illumination compensation value used in the block mode transmitting a bit stream after encoding an illumination compensation indicating flag and an illumination compensation value difference to the bit stream, and the P skip mode employs the existing method of predicting an illumination compensation value.

The flag setting unit 1220 receives the predicted illumination compensation value derived by the predicted illumination compensation value deriver 1210, and sets and outputs an illumination compensation indicating flag according to a method proposed by the present invention.

In the case of the B skip mode, a predicted illumination compensation value is derived according to the existing method of deriving a predicted illumination compensation value used in the block mode transmitting a bit stream after encoding an illumination compensation indicating flag and an illumination compensation value difference to the bit stream. Then, the illumination compensation indicating flag is set to "0" when the derived predicted illumination compensation value is "0," and is set to "1" when the derived predicted illumination compensation value is not "0."

The illumination compensation/movement compensation unit 1230 outputs a decoded picture by performing illumination compensation and movement compensation by using an illumination compensation indicating flag, a predicted illumination compensation value, a reference picture, and a movement vector.

Figure 9:
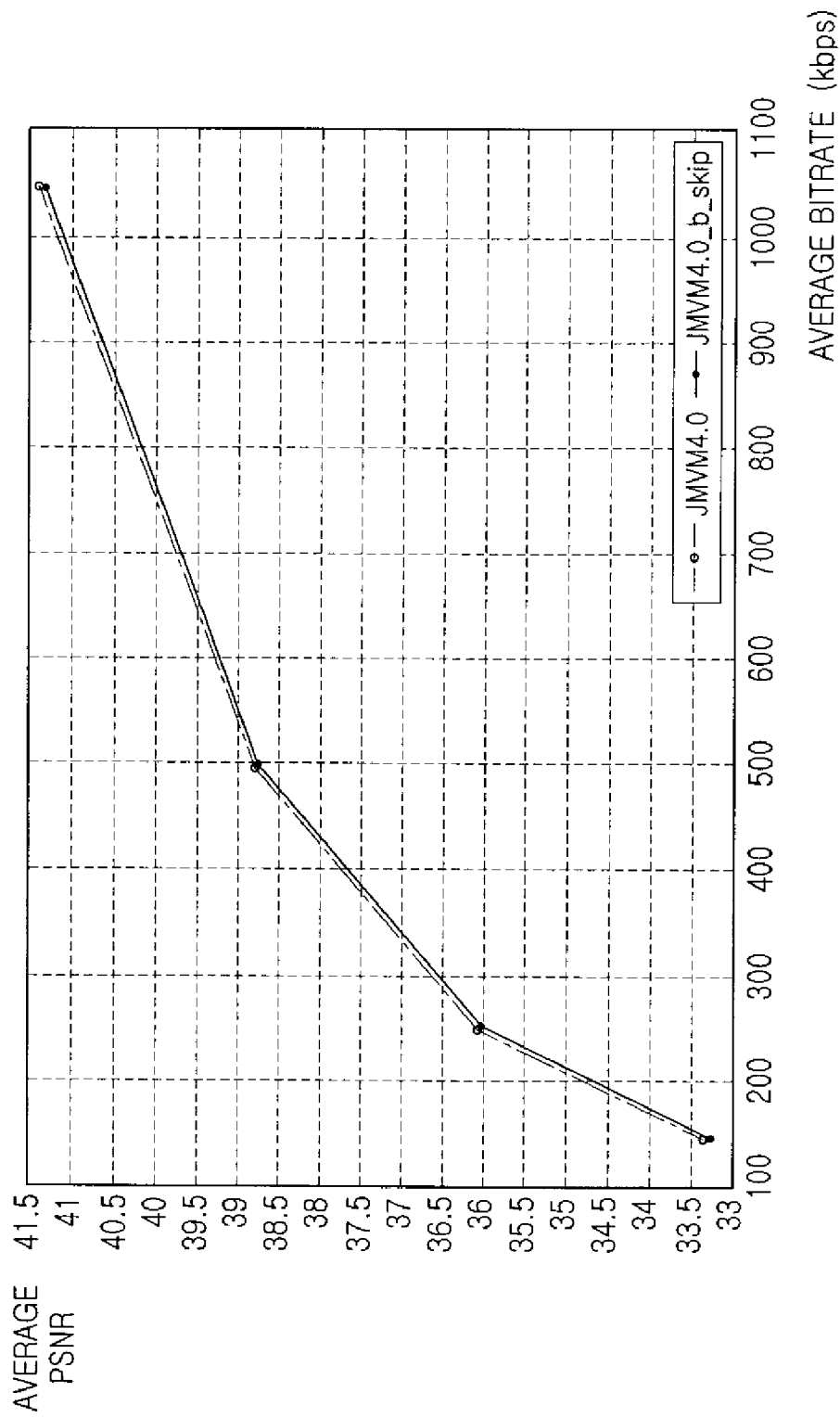
FIG. 9 is a graph showing a comparison between an existing illumination compensation method and an illumination compensation method according to an embodiment of the present invention for a Racel VGA 30 Hz picture sequence.
Figure 10:
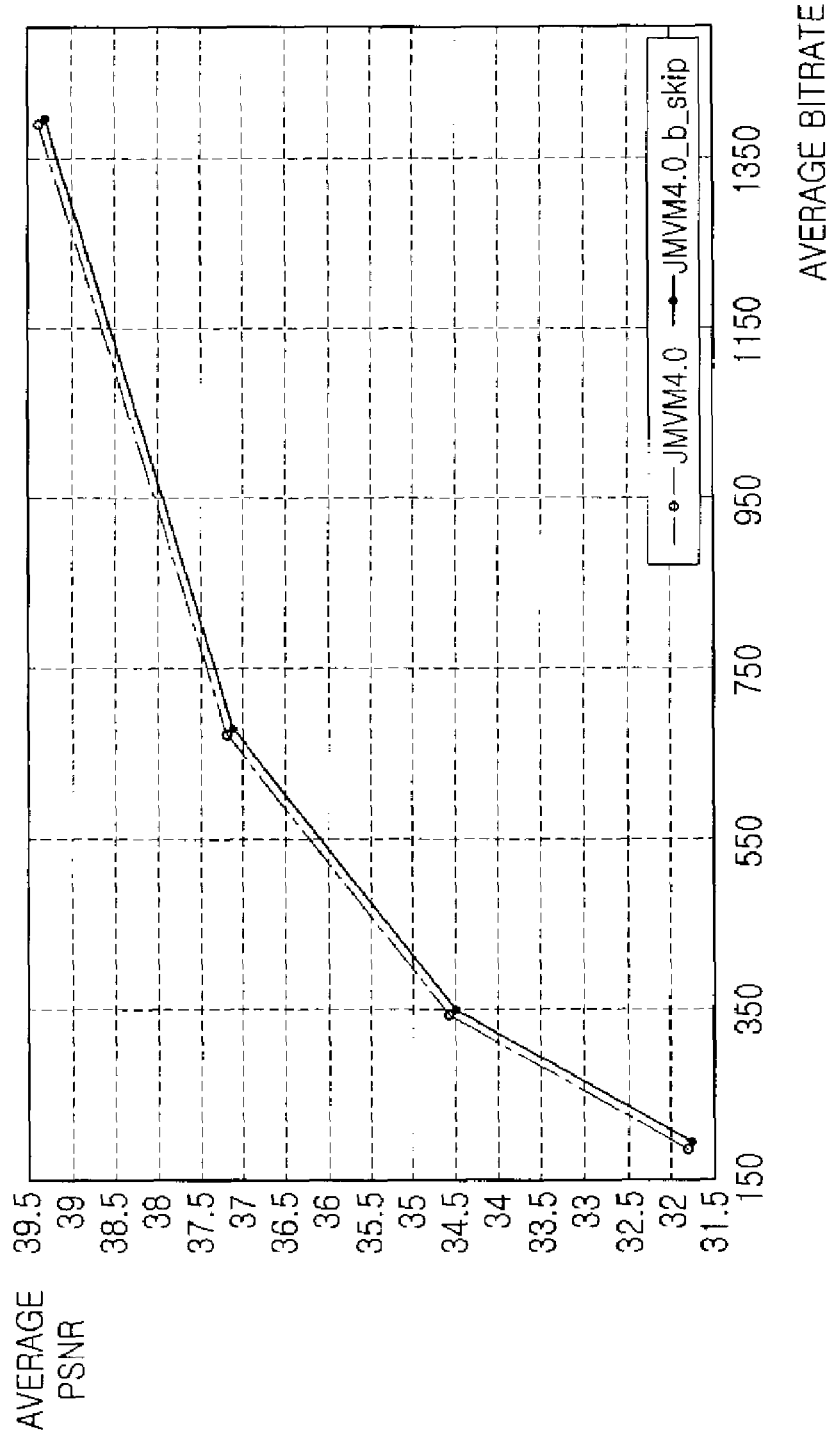
FIG. 10 is a graph showing a comparison between an existing illumination compensation method and an illumination compensation method according to an embodiment of the present invention for a Ballroom VGA 25 Hz picture sequence.

FIGS. 9 and 10 are graphs showing a comparison between an existing illumination compensation method and an illumination compensation method according to an embodiment of the present invention for a Racel VGA 30 Hz picture sequence and a Ballroom VGA 25 Hz picture sequence, respectively.

The existing method and the inventive method were tested by using JMVM 4.0 with changing Quantization Parameters (QPs) of 22, 27, 32, and 37 for a Racel VGA 30 Hz picture sequence and a Ballroom VGA 25 Hz picture sequence, respectively. Results of the test are shown in FIGS. 9 and 10, which denote that the existing method and the proposed method actually have similar performances.

In a method for illumination compensation in a multi-view video coding according to the present invention, an illumination compensation indicating flag is set based on a derived predicted illumination compensation value. Therefore, it is possible to omit an operation of deriving an illumination compensation indicating flag, which can reduce the quantity of operation. Further, the present invention can prevent the illumination compensation indicating flag in each block type from being derived to "1" simultaneously while the predicted illumination compensation is derived to "0." Therefore, according to the present invention, it is possible to more efficiently derive an illumination compensation indicating flag and a predicted illumination compensation value, which can improve the coding efficiency.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims. For example, although reference is made to the values of 0 and 1, it would be recognized that these values arc only referred to by way of example and that these values may be interchanged or replaced by other value, i.e., a first value and a second value.

What is claimed is:

1. A method of determining illumination compensation of a current block in a multi view video coding scheme, the method comprising:
    deriving a predicted illumination compensation value of the current block by using information on neighbor blocks of the current block in a B skip mode;
    setting an indication not to perform the illumination compensation when the derived predicted illumination compensation value of the current block has not been determined; and
    setting the indication to perform the illumination compensation when the derived predicted illumination compensation value of the current block has been determined.

2. The method of claim 1, wherein the information on the neighbor blocks of the current block comprises an illumination compensation value, a reference picture index, a block type, and a flag value indicating if corresponding neighbor blocks perform illumination compensation.

3. The method of claim 1, wherein, when the current block is in a B skip mode, the neighbor blocks of the current block comprise a first block, which is an upper neighbor block of the current block, a second block, which is a left neighbor block of the current block, a third block, which is a right neighbor block of the first block, and a fourth block, which is an upper neighbor block of the second block.

4. The method of claim 3, wherein the deriving a predicted illumination compensation value of the current block comprises:
    determining if the first block uses illumination compensation and setting an illumination compensation value of the first block as the predicted illumination compensation value of the current block when the picture referred to by the first block is equal to the picture referred to by the current block;
    when the picture referred to by the first block is not equal to the picture referred to by the current block, determining if the second block uses illumination compensation and setting an illumination compensation value of the second block as the predicted illumination compensation value of the current block when the picture referred to by the second block is equal to the picture referred to by the current block;
    when the picture referred to by the second block is not equal to the picture referred to by the current block, determining if the third block uses illumination compensation and setting an illumination compensation value of the third block as the predicted illumination compensation value of the current block when the picture referred to by the third block is equal to the picture referred to by the current block;
    when the picture referred to by the third block is not equal to the picture referred to by the current block, determining if the fourth block uses illumination compensation and setting an illumination compensation value of the fourth block as the predicted illumination compensation value of the current block when the picture referred to by the fourth block is equal to the picture referred to by the current block;
    when the picture referred to by the fourth block is not equal to the picture referred to by the current block, determining if all of the first block, the second block, and the third block use illumination compensation and setting a median value of illumination compensation values of the first block, the second block, and the third block as the predicted illumination compensation value of the current block when all of the first block, the second block, and the third block use illumination compensation; and
    when any of the first block, the second block, and the third block does not perform illumination compensation, setting the predicted illumination compensation value of the current block to indicate no illumination compensation.

5. The method of claim 1, wherein the step of setting the current block not to perform the illumination compensation corresponds to setting a flag value indicating if the current block performs illumination compensation to a first value, and the step of setting the current block to perform the illumination compensation corresponds to setting the flag value indicating if the current block performs illumination compensation to a second value.

6. An apparatus for illumination compensation of a current block performing illumination compensation in a B skip mode in a multi view video coding, comprising:
    a predicted illumination compensation value deriver for receiving a reference picture index of the current block and information regarding neighbor blocks of the current block, and deriving and outputting a predicted illumination compensation value;
    a flag setting unit for receiving the derived predicted illumination compensation value, and setting and outputting a flag indicating if the current block performs illumination compensation based on the derived predicted illumination compensation value; and
    an illumination compensation/movement compensation unit for performing illumination compensation and movement compensation by using a movement vector, a reference picture, the predicted illumination compensation value, and the flag indicating if the current block performs illumination compensation.

7. The apparatus of claim 6, wherein the information on the neighbor blocks of the current block comprises an illumination compensation value, a reference picture index, a block type, and a flag value indicating if corresponding neighbor blocks perform illumination compensation.

8. The apparatus of claim 6, wherein the neighbor blocks of the current block comprise a first block, which is an upper neighbor block of the current block, a second block, which is a left neighbor block of the current block, a third block, which is a right neighbor block of the first block, and a fourth block, which is an upper neighbor block of the second block.

9. The apparatus of claim 7, wherein the predicted illumination compensation value deriver performs:
   determining if the first block uses illumination compensation and setting an illumination compensation value of the first block as the predicted illumination compensation value of the current block when the picture referred to by the first block is equal to the picture referred to by the current block;
   when the picture referred to by the first block is not equal to the picture referred to by the current block, determining if the second block uses illumination compensation and setting an illumination compensation value of the second block as the predicted illumination compensation value of the current block when the picture referred to by the second block is equal to the picture referred to by the current block;
   when the picture referred to by the second block is not equal to the picture referred to by the current block, determining if the third block uses illumination compensation and setting an illumination compensation value of the third block as the predicted illumination compensation value of the current block when the picture referred to by the third block is equal to the picture referred to by the current block;
   when the picture referred to by the third block is not equal to the picture referred to by the current block, determining if the fourth block uses illumination compensation and setting an illumination compensation value of the fourth block as the predicted illumination compensation value of the current block when the picture referred to by the fourth block is equal to the picture referred to by the current block; and
   when the picture referred to by the fourth block is not equal to the picture referred to by the current block, determining if all of the first block, the second block, and the third block use illumination compensation, and setting a median value of illumination compensation values of the first block, the second block, and the third block as the predicted illumination compensation value of the current block when all of the first block, the second block, and the third block use illumination compensation; and
   when any of the first block, the second block, and the third block does not perform illumination compensation, setting the predicted illumination compensation value of the current block to indicate non performance of illumination compensation.

10. The apparatus of claim 6, wherein the flag setting unit sets a flag value indicating if the current block performs illumination compensation to a first value when the received predicted illumination compensation value is indicated to be non-performance, and sets the flag value to a second value when the received predicted illumination compensation value is indicated to be perform illumination compensation.

11. A device for determining illumination compensation of a current block in a multi view video coding scheme, comprising:
   a processor in communication with a memory, the memory including code which when accessed by the processor causes the processor to execute the steps of:
   deriving a predicted illumination compensation value of the current block by using information on neighbor blocks of the current block in a B skip mode;
   setting an indication not to perform the illumination compensation when the derived predicted illumination compensation value of the current block has not been determined; and
   setting an indication to perform the illumination compensation when the derived predicted illumination compensation value of the current block has been determined.

12. The device of claim 11, wherein the information on the neighbor blocks of the current block comprises an illumination compensation value, a reference picture index, a block type, and a flag value indicating if corresponding neighbor blocks perform illumination compensation.

13. The device of claim 11, wherein, when the current block is in a B skip mode, the neighbor blocks of the current block comprise a first block, which is an upper neighbor block of the current block, a second block, which is a left neighbor block of the current block, a third block, which is a right neighbor block of the first block, and a fourth block, which is an upper neighbor block of the second block.

14. The device of claim 13, wherein the deriving a predicted illumination compensation value of the current block comprises:
   setting an illumination compensation value of the first block as the predicted illumination compensation value of the current block when the picture referred to by the first block is equal to the picture referred to by the current block and the first block uses illumination compensation;
   setting an illumination compensation value of the second block as the predicted illumination compensation value of the current block when the picture referred to by the second block is equal to the picture referred to by the current block and the second block uses illumination compensation;
   setting an illumination compensation value of the third block as the predicted illumination compensation value of the current block when the picture referred to by the third block is equal to the picture referred to by the current block and the third block uses illumination compensation;
   setting an illumination compensation value of the fourth block as the predicted illumination compensation value of the current block when the picture referred to by the fourth block is equal to the picture referred to by the current block and the fourth block uses illumination compensation;
   determining if all of the first block, the second block, and the third block use illumination compensation, and setting a median value of illumination compensation values of the first block, the second block, and the third block as the predicted illumination compensation value of the current block when all of the first block, the second block, and the third block use illumination compensation; and
   when none of the first block, the second block, and the third block perform illumination compensation, setting the predicted illumination compensation value of the current block to indicate no illumination compensation.

15. The device of claim 11, wherein the step of setting the current block not to perform the illumination compensation corresponds to setting a flag value indicating if the current block performs illumination compensation to a first value, and the step of setting the current block to perform the illumination compensation corresponds to setting the flag value indicating if the current block performs illumination compensation to a second value.

* * * * *